E. F. ANDREWS

Jan. 12, 1932.

RADIORECEIVING DEVICE

Original Filed March 20, 1928

Re. 18,325

2 Sheets-Sheet 1

Inventor
Edward F. Andrews
by Parker & Carter
Attorneys.

E. F. ANDREWS

Jan. 12, 1932.

RADIORECEIVING DEVICE

Original Filed March 20, 1928

Re. 18,325

2 Sheets-Sheet 2

Inventor
Edward F. Andrews.
By Parker & Carter
Attorneys

Reissued Jan. 12, 1932

Re. 18,325

UNITED STATES PATENT OFFICE

EDWARD F. ANDREWS, OF CHICAGO, ILLINOIS, ASSIGNOR TO ANDREWS-HAMMOND CORPORATION, OF CHICAGO, ILLINOIS, A CORPORATION OF ILLINOIS

RADIORECEIVING DEVICE

Original No. 1,791,783, dated February 10, 1931, Serial No. 263,006, filed March 20, 1928. Application for reissue filed February 11, 1931. Serial No. 514,639.

My invention relates to a radio receiving set and particularly to a portable set wherein the entire receiving mechanism is mounted in a single readily movable housing. The principal object of this invention is to provide a structure for a complete radio receiver, totally different from current practice, which may include a loud speaker, which shall be readily portable about the room or house, which will stand directly on the floor, and which will at the same time locate the controlling and indicating mechanism at a height convenient to the hand of a sitting, standing or reclining operator. A further object is to provide a set as above described which can be housed in a relatively small compact metal container which will be cheap to build and at the same time will lend itself to a pleasing decorative effect from all sides. A further object is to provide a set of this character which may be connected to any light socket by a plug on the end of a relatively long flexible cable, which cable and plug may constitute the only connections necessary to operate the set, antenna and ground connections as well as power for the set being derived, if desired, from this single connection to the lighting circuit. A further object is to provide such a set which shall have its center of gravity located very close to the floor upon which it stands, so that it will have a minimum tendency to tip over if pushed or kicked.

Other objects will appear from time to time in the course of the specification and claims.

I illustrate my invention more or less diagrammatically in the accompanying drawings, wherein—

Like parts are indicated by like symbols throughout the specification and claims.

Referring to the figures, A indicates any suitable base member, herein indicated as a flat, floor engaging element. Upwardly projecting therefrom, as at the corners therefrom, as at the corners thereof, are a plurality of vertical supports or rods $A^1$ about which are positioned spacer sleeves $A^2$ which may be employed to support a plurality of intermediate shelves or stories $A^3$ $A^4$.

B generally indicates a housing having the vertical sides $B^1$ and the top position $B^2$, the top being made sound pervious by a plurality of apertures $B^3$. The sides $B^1$ and the top $B^2$ are preferably integral or secured together so that the housing may be removed as a whole. $B^4$ indicates a handle for said housing, herein shown as secured to the top thereof. Any suitable means may be employed for securing the lower edge of the housing sides $B^1$ to the base A such as the screws $B^5$. Upon removal of these screws the entire housing may be lifted as a unit from the base, leaving the entire internal structure fully accessible.

Figure 2:
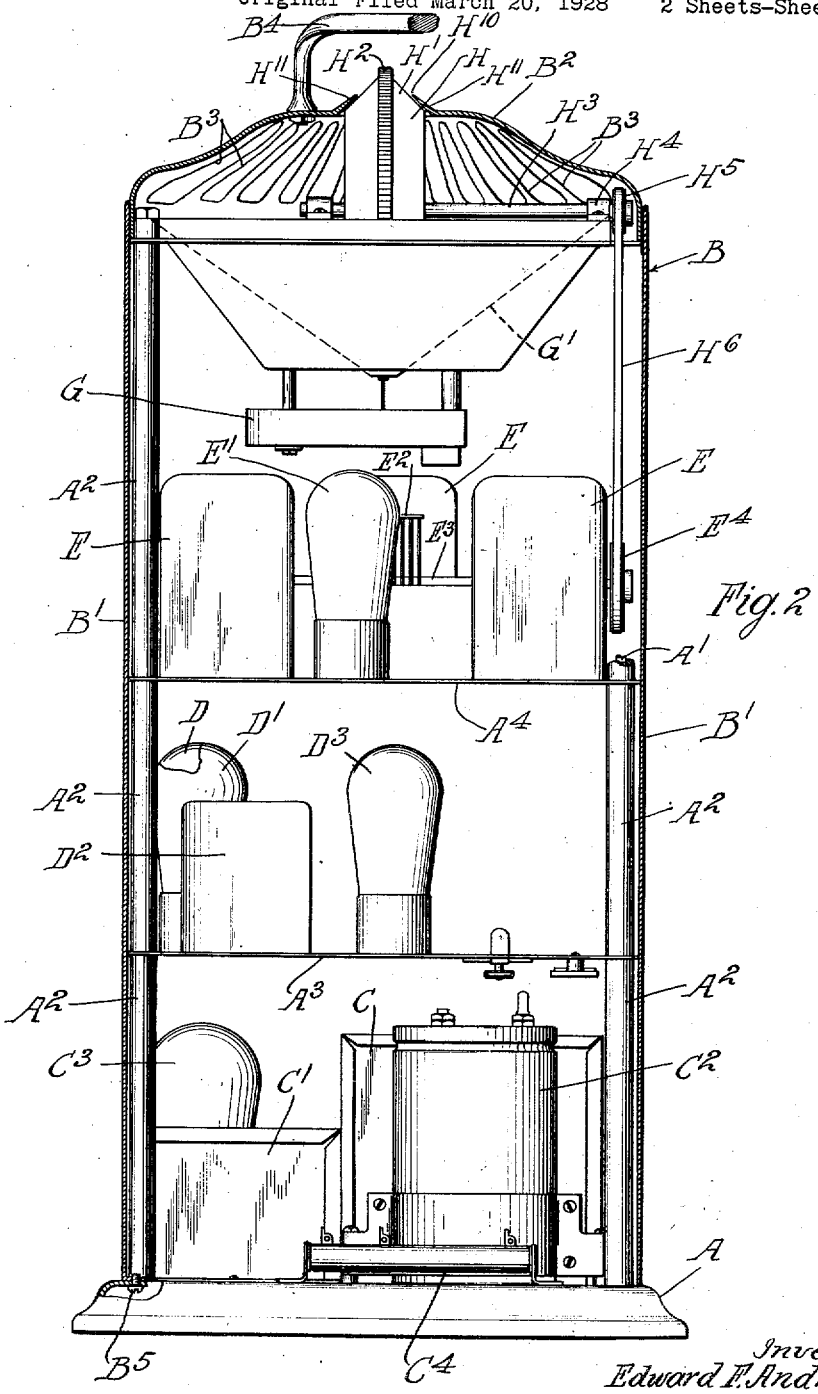
Figure 2 is a vertical section.

Referring more particularly to Figure 2, I show as positioned at the bottom of the set, upon the base A, a transformer C, choke coils $C^1$, condensers $C^2$, a rectifying tube $C^3$ and a resistance $C^4$, constituting the A and B current supply means for the complete set. These units generally constitute the heaviest portion of the set and by locating them immediately adjacent the floor, I increase the stability of the device and its resistance to tipping.

Located on the shelf $A^3$, immediately above the power units and supported by the lowermost spacers $A^2$, is the audio frequency amplifier indicated as including the tubes D $D^1$ and the transformers $D^2$. The detector tube $D^3$ may also be positioned on this shelf. This location of the detector tube has the advantage of getting it further away from the loud speaker and thereby decreasing the tendency toward the reaction between the detector or early stages of audio amplification and the loud speaker, known as microphonic action.

Supported on the set of supporting sleeves $A^2$ immediately above the audio amplifier and positioned for example on the shelf $A^4$ is the radio frequency amplifier and tuning means which includes the shielded radio frequency transformers E and the radio frequency amplifying tubes $E^1$. The variable condensers $E^2$, which may constitute the tuning means, are preferably mounted on a single shaft $E^3$ with a pulley $E^4$ at the end thereof. The shaft $E^3$ is shown as horizontal, but may be otherwise arranged.

Above the radio frequency amplifier, mounted for instance upon a still higher shelf $A^5$, is a loud speaker motor G driving an air displacing diaphragm or a cone $G^1$. Within the concave side of the cone $G^1$ is mounted a rotatable drum H with inclined sides $H^1$ carrying any suitable graduations and having its center edge knurled as at $H^2$ to facilitate manual rotation. The drum H is mounted upon the shaft $H^3$ which is carried in the bearings $H^4$. Upon the end of the shaft $H^3$ is a pulley $H^5$. A belt $H^6$, consisting preferably of metal with a spring adjusting means for keeping it taut, connects the pulley $H^5$ to the pulley $E^4$, so that the rotation of the drum H will rotate the pulley $E^4$ at substantially one-half speed, thus varying the capacity of the variable condensers $E^3$ and thereby effecting the adjustment of the set to receive carrier waves of different frequencies.

It might be possible in some cases to eliminate the shelf $A^3$ and mount the apparatus shown thereon upon the bottom side of the shelf $A^4$ and projecting downwardly therefrom.

It will be observed that the top $B^2$ of the housing is apertured as at $H^{10}$ in order to permit the projection therethrough of the drum H. The edge of the aperture may be provided with upwardly projecting points or indicators $H^{11}$ against which graduations on the drum H may be read.

Figure 3:
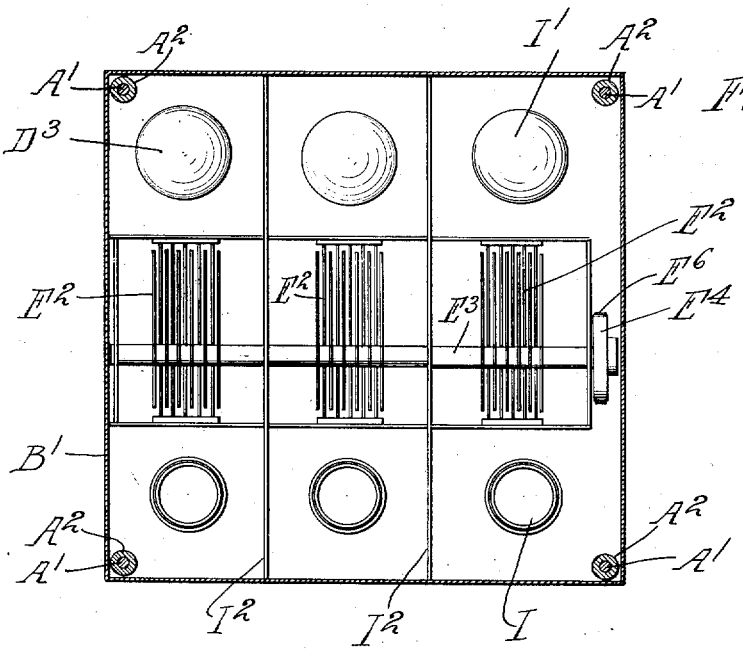
Figure 3 is a horizontal section.

Referring for example to Figure 3 this shows an alternative construction of the radio frequency portion of the set, whereby each radio frequency stage is contained within a shielded compartment. For instance the right hand compartment may contain the radio frequency transformer I, that section of the variable condenser $E^2$ which connects to the transformer I and the radio frequency amplifying tube $I^1$, these units together constituting the first stage of the radio frequency amplifier. The stage above described is separated from the adjoining stage, for example by the middle wall $I^2$, and in fact may be enclosed on all sides and by a metal wall so as to shield this stage so far as possible from the succeeding stages, except through the amplifying action of the tube. In like manner the two succeeding stages may be enclosed in metal compartments. In some cases it may be preferable to include the detector tube in the last compartment, indicated as $D^3$.

Referring to Figure I, K indicates a flexible conductive connection which is connected to or passes through the housing adjacent the floor level, as at $K^1$, preferably immediately adjacent the floor. Any suitable plug $K^2$ is mounted at the opposite end of the cord K, it being understood that it is adapted to be plugged into the usual electric lighting outlets. It is important that the cord be connected to the housing at or very close to the floor level, in order that there may be a minimum tendency for anyone to trip over the cord.

Figure 1:
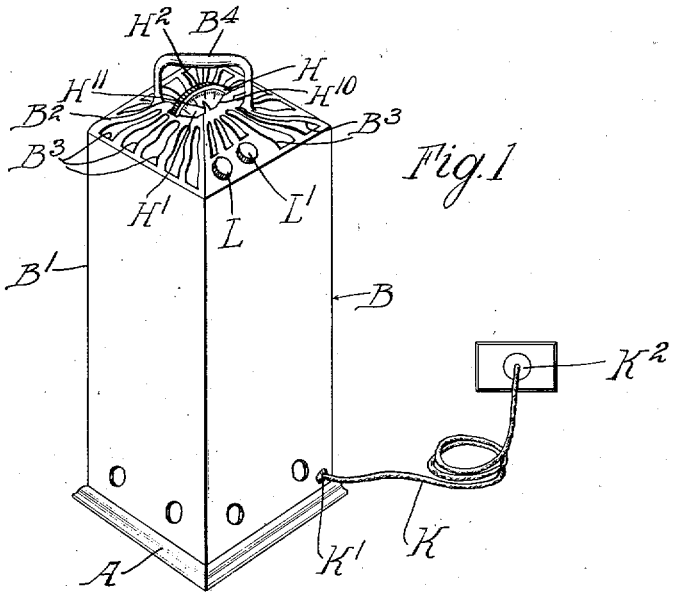
Figure 1 is a perspective view.

L $L^1$ indicate a switch and a volume control respectively, positioned for example at the top of the housing as shown in Figures 1 and 2. The switch $L^1$ is so arranged as to turn the radio set and power devices on or off as a whole.

It will be realized that whereas I have described and shown a practical and operative device, nevertheless many changes might be made in the size, shape, number and disposition of parts without departing from the spirit of my invention, and I therefore wish my description and drawings to be taken as in a broad sense illustrative and diagrammatic rather than as limiting me to my specific showing.

The use and operation of my invention are as follows:

I have described above a readily portable radio receiver which may be moved about from place to place in the room or in the house, and may be located close to the chair or couch occupied by the operator, thus permitting the operator to tune in different stations and adjust the set without arising. The control means is located at such a height as to be readily operable by the operator from a sitting, standing or reclining position. The device is adapted to stand at any point in a room, may be positioned away from the wall, and presents a pleasing appearance on all sides. It is easily controlled, and the setting of the indicating means may be observed from almost any direction without the necessity of turning the set around so as to face the operator. A handle is preferably provided, whereby the set can be carried easily from place to place. By plugging the cable attached to the set into an electric lighting outlet, all connections may be made that are required for supplying the set with power for its operation and for receiving the signal which operates it.

For a readily portable set of this kind a certain type of structure is advantageous. A certain volume must be provided within the housing, to enclose various elements necessary for a complete radio set including the power devices and loud speaker. If a housing is built to occupy a considerable floor space, then it will be either entirely too low to bring the control and indicating mechanisms to a convenient height, for observation and actuation, or, if made high, it will be very much larger than is necessary to house the apparatus, and will be correspondingly heavy, bulky and expensive. It is believed that the most advantageous height for the control and indicating devices from the floor, or for the control devices, if the indicating devices are separately located, lies somewhere between 18 to 30 inches, 22 to 24 inches being thought preferable.

If the device is high, then it must occupy a larger floor space, and have a larger base area, in order not to be unstable. It is thought to be highly advantageous to use a device which may occupy a floor space of 12 inches by 12 inches or less and which is two feet or less high. A container of this size provides ample space for apparatus at present available, and by locating the power devices in the base, may be given a very considerable degree of stability. It is thought preferable to make a portable radio receiver of this kind generally square or round in shape. If the device is made relatively long and narrow in plan, then it will have more stability, endwise, than necessary, and will be relatively unstable, transversely, unless it is made considerably wider than is necessary to supply the proper amount of space for housing the apparatus. It will also be seen that the weight of a device of this kind must be kept relatively low, since otherwise it is portable only by use of an amount of effort that detracts very much from its advantages. It should be possible to carry it comfortably free from the floor without flexing the arm.

One advantage of the structure herein shown is the wide separation, or long air path, between the front and back of the cone. This is particularly important to give volume to the low notes since if the air compressed by a forward movement to the front of the cone were able to flow quickly into the evacuated space to the rear of the cone, then the work done upon the air would be less, particularly in case of the low notes. It has been stated that for efficient reproduction of the low notes, the air path between front and rear of the vibrating member should equal one quarter of whatever wave length of note is being reproduced.

In the device herein shown, the air path is of substantial length owing to the fact that the air vents employed in the sides of the housing $B^1$ can be located adjacent the bottom of the housing.

The flexible cable carrying the plug for insertion into the electric lighting outlet may be attached to the housing by means of another removable plug, or the cable may pass through the housing at a point immediately adjacent the floor. If the cable passes out at any appreciable distance above the floor, anyone walking by the set would have a much greater tendency to catch a toe in the cable and trip over it.

There is an advantage in the construction of a radio set on a series of shelves, each shelf constituting the base for a logical division of the radio set. The power devices naturally go together. The radio frequency transformers, tubes and circuits are naturally associated with the tuning means. The audio frequency amplifier can if desired be logically associated with the radio frequency amplifier. This can be affected by mounting the audio frequency amplifier on the bottom of the base supporting the radio frequency amplifier. The loud speaker is also logically a separate unit. Constructing the set in units of this kind which are held together one above the other by through bolts and spacers gives a considerable degree of flexibility to the design, it being possible to change the radio frequency amplifier without changing the rest of the set or to change any other unit without necessarily affecting its associated units. It is desirable not to put too much material on one shelf, as otherwise the dimensions of that shelf becomes so large as to add unnecessarily to the lateral extension of the entire apparatus.

The drum form of control with the graduations located on sloping sides is advantageous as it permits the most easy reading of the graduations from any position in which the eyes are located above the indicating means. If the set is built low as suggested the indicating means is always looked at more or less from above. If the tuning control is horizontal it is difficult to read it from a low sitting or reclining position. If the indicating means is vertical it is difficult to read it from a standing position. This drum form of control also lends itself to being operated from any side of the device.

I claim:

1. In a portable radio receiver, a column-like container of substantially equal cross-section throughout its length, a hand operable indicating mechanism located on the top of the container and accessible for adjustment from all sides of the container and having a plurality of similar scales readable alike from diametrically opposite positions at the sides of the container, one or more of said scales being also readable from directly above the container.

2. A small radio receiving set comprising a container elongated vertically whereby it will occupy a minimum of floor space and be readily portable and a chassis including a sound reproducer and a plurality of thermionic tubes associated therewith one or more being arranged one above another in said container, said chassis substantially filling said container, a plurality of said tubes having their major axes parallel to the major axis of said chassis, said container providing a baffle effect between opposite sides of said reproducer and having a plurality of apertures providing an air path between opposite sides of said reproducer, and mounting means associated with said chassis and carried in said container separating said tubes and shielding a tube at one level from apparatus at another level.

3. A small and portable radio receiving set comprising a column-like container of substantially equal cross sectional area throughout its length and having its greatest dimension in a vertical plane, a chassis including a plurality of receiver units arranged one above another to substantially fill said container, the height of said container being sufficient to provide mounting and operating space for said units when arranged one above another, and a plurality of metallic shelves carrying said units, one or more of said shelves being removably mounted on said chassis one above another in said container whereby each said shelf shields the receiver units thereabove from the receiver units therebelow.

4. A radio receiving set comprising a base member and a separable container consisting of a vertically elongated casing member, and a complete radio receiver removably mounted on said base member at a plurality of levels one above another in said casing member, said receiver substantially filling said container and cooperating therewith to render said receiving set readily portable and said receiver including a multi-stage amplifier and tuning means therefor carried by said base member in said elongated casing member, a metallic horizontal shelf separating and shielding said amplifier and the tuning means from other receiver apparatus in said container, and radio control devices extending above said elongated casing member including tuning control means operably connected with said tuning means of said amplifier for tuning said receiver.

5. A small portable radio receiving set comprising a vertically elongated chassis including a plurality of thermionic tubes arranged one above another and separated by conducting shelves, and a sound reproducer associated with said thermionic tubes, and a vertically elongated container substantially filled by the apparatus of said chassis and providing a separation between opposite sides of said reproducer, said container having openings therein separated by the walls of said container to provide a baffle effect.

6. A floor type radio receiving set comprising a column-like casing and a vertically elongated chassis separably carried therein and including radio receiving apparatus substantially filling said casing, said receiving apparatus including a plurality of vacuum tubes mounted vertically one above another on said chassis a plurality of said tubes having their major axes parallel to the major axis of said chassis, and radio tuning control means for said receiving apparatus extending above said casing.

7. A portable floor type radio receiving set comprising, a container, a chassis elongated in a vertical direction substantially filling said container, whereby the weight and bulk of the receiving set as a whole is minimized, receiving devices tending to exert a detrimental effect one on the other located at opposite ends on said chassis, said receiving devices including a plurality of thermionic tubes arranged one above another along the major axis of said chassis, one end of said chassis being positioned adjacent the floor, and control and indicating means at the opposite end of the chassis positioned on the top thereof at a height from the floor between that of the seat and that of the arms of an ordinary living room chair, said container being of substantially uniform cross sectional area throughout its length and having apertures in its top for said control and indicating means, a loud speaker carried by said chassis, said container forming a baffle having openings in front of and behind said speaker at a substantial distance from one another.

8. In a portable floor type radio receiver, a cabinet having its greatest dimension in a vertical direction, a similarly shaped chassis substantially filling said cabinet, a handle atop the cabinet and chassis for readily lifting the receiver, a tuning control also atop the cabinet and chassis, said handle and control being located at a height between that of the seat and that of the arms of an ordinary living room chair, thermionic tubes and inductances mounted on said chassis and progressing from the top toward the bottom in accordance with the weight of the associated inductances, a plurality of said tubes having their major axes parallel to the major axis of said chassis, and a loud speaker mounted on said chassis and employing said cabinet for its baffle.

9. A small and portable radio receiving set comprising a column-like container of substantially equal cross sectional area throughout its height and having its greatest dimension in a vertical plane, a cone type loud speaker mounted in the top of said container with its cone on a vertical axis, a plurality of apertures in the top of said container on one side of the speaker cone through which the sound from said cone will be directed upwardly, and a plurality of apertures in said container on the other side of said cone spaced substantially from the first mentioned apertures toward the bottom of said container so that said container constitutes an effective baffle for said speaker, and radio receiving and amplifying apparatus including a plurality of thermionic tubes mounted in said container.

10. A floor type radio receiving set comprising a container, a chassis elongated in a vertical direction substantially filling said container, whereby the weight and bulk of the receiving set as a whole is minimized, receiving devices including a plurality of thermionic tubes arranged at a plurality of levels on said chassis, one end of said chassis being positioned adjacent the floor, and control and indicating means at the opposite end of the chassis positioned on the top thereof at a height from the floor between that of the seat and that of the arms of an ordinary living room chair, said container being of substantially uniform cross sectional area throughout its length and having apertures in its top for said control and indicating means, a loud speaker carried by said chassis, said container forming a baffle having openings in front of and behind said speaker at a substantial distance from one another.

11. In a portable floor type radio receiver, a cabinet having its greatest dimension in a vertical direction, a similarly shaped chassis substantially filling said cabinet, a tuning control atop the cabinet and chassis, said control being located at a height between that of the seat and that of the arms of an ordinary living room chair, thermionic tubes and inductances mounted on said chassis and progressing from the top toward the bottom in accordance with the weight of the associated inductances, and a loud speaker mounted on said chassis and employing said cabinet for its baffle.

12. A radio receiving set comprising a column-like container having its greatest dimension in a vertical plane, a cone type loud speaker mounted in the top of said container with its axis substantially vertical, an aperture at the top of said container on one side of the speaker cone through which the sound from said cone will be directed, and another aperture in said container on the other side of said cone spaced substantially from the first mentioned aperture at the bottom of said container so that said container constitutes a long baffle for said speaker, and radio receiving and amplifying apparatus including a plurality of thermionic tubes mounted in said container.

13. A radio receiving set comprising a column-like container of substantially equal cross sectional area throughout its height, and having its greatest dimension in a vertical plane, a top member for the cabinet, a cone type loud speaker mounted in the top of said container with its axis substantially vertical, an aperture in the top of said container on one side of the speaker cone through which the sound from the cone will be directed, and another aperture in the container on the other side of the cone spaced a substantial distance downwardly from said first mentioned aperture, so that said container constitutes a long baffle for said speaker and a radio receiving and amplifying apparatus including a plurality of thermionic tubes mounted in said container.

14. A floor type radio receiving set comprising a column-like casing and a vertically elongated chassis separably carried therein and including radio receiving apparatus substantially filling said casing, said receiving apparatus including a plurality of vacuum tubes mounted vertically one above another on said chassis, a loud speaker also mounted on said chassis, said casing being apertured so as to act as a baffle for said speaker, and radio tuning control means for said receiving apparatus extending above said casing.

15. A floor type radio receiving set comprising a column-like casing and a vertically elongated chassis separably carried therein and including radio receiving apparatus substantially filling said casing, said receiving apparatus including a plurality of vacuum tubes mounted vertically one above another on said chassis, a cone type speaker also mounted on said chassis, with the axis of its cone substantially vertical, the casing being apertured above and below the speaker, and means for preventing free movement of air within the casing between the front and back of said speaker, the apertures below and above the speaker being separated by a distance greater than the maximum horizontal dimension of the casing.

16. In a radio receiver a column-like housing having a sound pervious upper portion, a cone type speaker positioned substantially horizontally adjacent and below said sound pervious upper portion, and audio and radio amplifying means positioned below said speaker, said housing having another sound pervious portion located at a substantial distance below said speaker.

17. A radio receiver comprising a vertically elongated column-like container, receiving apparatus contained therein, the container having vertical side walls substantially completely enclosing a column of air, a plurality of radio parts composing said receiving apparatus, disposed one above another in a plurality of horizontal planes within said container, and a baffle-requiring loud speaker mounted at the top of said container so that said vertical side walls form a long tube-like baffle for said speaker, and an opening at or near the bottom of said container, completing a long air path, including said enclosed column of air, from the front to the back of said speaker.

To which foregoing specification and claims the applicant hereby subscribes his name at Chicago, Illinois, this 6th day of February, 1931.

EDWARD F. ANDREWS.